United States Patent Office 3,413,733
Patented Dec. 3, 1968

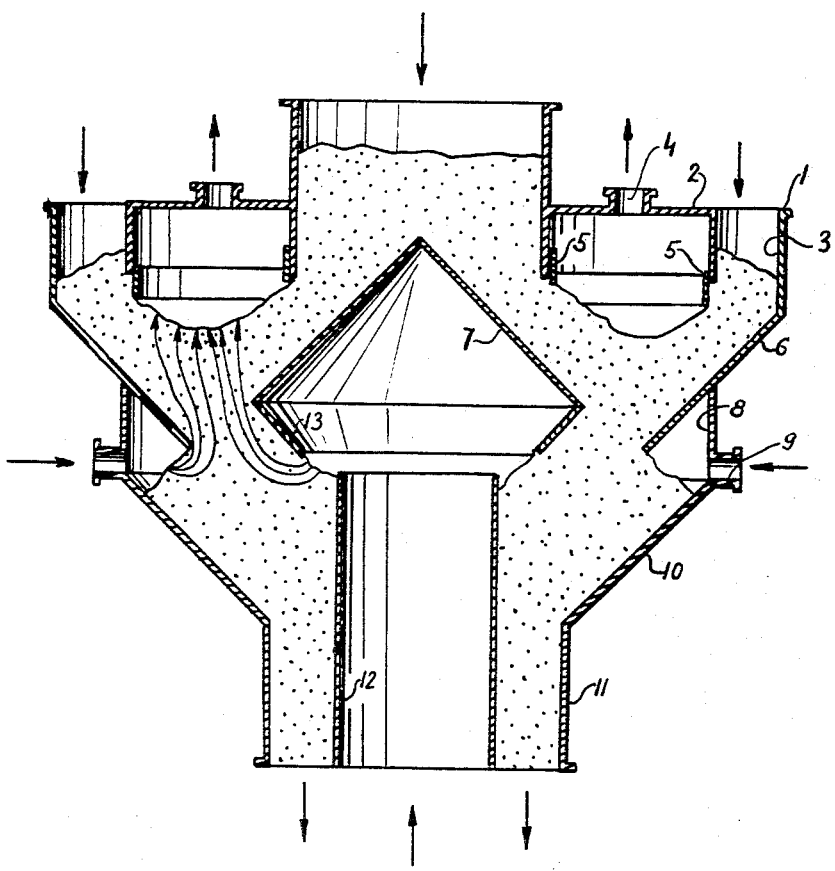

3,413,733
SHAFT EXCHANGER
Jaroslav Pospíšil and Josef Plšek, Prerov, Václav Hubáček, Olomouc, and Oldřich Kučeřík, Kostelec u Holesova, Czechoslovakia, assignors to CKD Praha, Oborovy Podnik, a corporation of Czechoslovakia
Filed Oct. 18, 1966, Ser. No. 587,523
Claims priority, application Czechoslovakia, Oct. 21, 1965, 6,341/65
8 Claims. (Cl. 34—171)

ABSTRACT OF THE DISCLOSURE

A vertical shaft heat exchanger for heating granular materials passing therethrough by hot gases. A hollow annular distributing member is co-axially mounted in the vertical shaft heat exchanger. The granular material is introduced from above into the shaft exchanger where it is divided into two streams which pass through a pair of channels which are defined by the external walls of the shaft exchanger, and a guiding member co-axially mounted therein. Hot gases are introduced into the heat exchanger and axially from below and pass through the granular material in counter-current flow.

---

The invention relates to a shaft exchanger for treating granular materials for example, preheating the materials. More particularly the invention relates to a novel arrangement of the feed space for incoming materials.

Shaft exchangers for treating granular materials are preferably arranged so as to have the material feed hopper project into the inner space of the shaft exchanger. The feed hopper is thus arranged opposite a guiding member which serves to introduce the granular materials and to equally distribute them within the space of the shaft. A material collector is secured to the inner wall of the shaft exchanger and projects into the space of the discharge bin. In the wall of the exchanger opposite the collector there is provided a conduit for preheating gases causing the gases to pass through the material in cross streams. The wall of the material feed hopper and the walls of the shaft exchanger define a channel, through which the cooled gases discharge from the exchanger. The aforedescribed arrangement of the collector causes the material to form piles between the walls and the adjacent edges of the guiding member which tend to form vaults between the walls of the collectors and a discharge bin if a large quantity of material undergoes treatment in the shaft exchanger, thereby the discharge of material out of the exchanger is prevented. The aforementioned difficulties would adversely affect the operation of exchangers, especially those designed for higher outputs where a continuous operation is of utmost importance.

The structural arrangements of the known shaft exchangers for higher outputs have excessively large dimensions which results in excessively high weights and, consequently, high installation costs. Owing to the fact that the hot gases and material interact on the cross-stream principle, the temperature efficiency of these known shaft exchangers is reduced, which is not desirable.

It is accordingly a general object of the invention to provide an apparatus with a lower consumption of heat per unit of treated material having a higher output and reduced operation and start-up costs.

Keeping this object in mind, the shaft exchanger of this invention has a hollow distributing member which is movably mounted in the feeding region of the vertical shaft, the outer dimension of the hollow distributing member being smaller than the internal diameter of the vertical shaft.

In the top wall of the hollow distributing member within the vertical shaft there are gas apertures provided and beneath the hollow distributing member there is disposed a guiding member for guiding the granular material. In order to regulate the stream of the granular material on the guiding member there is a sliding member adjustably arranged on the bottom part of the hollow distributing member opposite the guiding member. The vertical shaft has a tetrahedron shape, the hollow distributing member being attached within the vertical shaft and is shaped as a longitudinal member which is attached to the walls of the shaft. The wall of the vertical shaft opposite the hollow distributing member is shaped as a chute in relation to its vertical axis.

Beneath this chute there is provided an additional cylindrical wall for conducting gases. The cylindrical wall of the vertical shaft has a smaller internal diameter than the opposite cylindrical wall of the hollow distributing member and is arranged flush with the outer wall of the hollow distributing member. Beneath the gas conduit the wall forms a chute, the bottom edge of which is adapted to be attached to a discharge bin. Within the vertical shaft beneath the guiding member a cylinder is positioned, the top edges of which project into the space of the guiding member. The guiding member has a downwardly extending collar. The collar of the guiding member is attached to the bottom edge thereof perpendicularly, the height of this collar being the same or larger than the distance between the bottom edge of this collar and the top edges of the wall of the cylinder within the discharge bin. The collar of the guiding member, the walls of the chute formed by the vertical shaft opposite the hollow distributing member and the walls of the chute having a smaller dimension are spaced parallelly. The hollow distributing member in the vertical shaft has a ring shape, the guiding member beneath said ring having a conical shape.

The embodiment of the invention is illustrated in the accompanying drawing, in which there is illustrated an elevation of the arrangement of the shaft exchanger having the hollow distributing member disposed in its feed region.

The shaft exchanger comprises a vertical shaft 1, in the feed region of which there is co-axially mounted a hollow distributing member 2. The outer dimension of the hollow distributing member 2 is smaller than the distance between the inner walls 3 of the vertical shaft 1. On the top wall of the hollow distributing member 2 a pair of outlets 4 are provided, through which the cooled gases can be discharged out of the working region of the vertical shaft. At the bottom of the hollow distributing member 2 a sliding extension 5 is adjustably arranged. Beneath the hollow distributing member 2 a guiding member 7 is mounted in the working region of the vertical shaft 1. The hollow distributing member 2 is composed of oblong elements in the vertical shaft 1 which are shaped as tetrahedrons or as an annular ring in a circular vertical shaft. The wall 3 of the vertical shaft is shaped at its bottom part as a chute 6. Beneath this chute 6 of the wall 3 of the vertical shaft 1 there is an additional cylindrical wall 8 of the vertical shaft 1 which is provided with gas conduits 9. This wall 8 has a smaller diameter than the cylindrical wall 3 opposite the hollow distributing member 2 in the feeding region. The wall 8, having this smaller diameter with the gas conduit 9 is arranged flush with the outer wall of the hollow distributing member 2. This wall 8 of the vertical shaft 1 extends beneath the conduit 9 where it forms a chute 10, the bottom edge of the chute being attached to the wall 11 at the discharge region of the device. Beneath the guiding member 7 within the vertical shaft 1 a cylinder 12 is co-axially disposed, which projects into the space of the discharge region. The guiding member 7 is equipped at its bottom with a collar 13 narrowing towards the vertical axis of the guiding member 7. The collar 13 of the guiding member 7 is attached perpendicularly to the bottom edge thereof, the height of the collar being the same or larger than the distance between the extremity of the collar 13 and the opposite wall of the cylinder 12 in the discharge bin. In order to favor continual feeding of material in the device the collar 13 of the guiding member 7, the chute 6 of the wall 3 of the vertical shaft 1 opposite the hollow distributing member 2 and the chute 10 of the additional wall 8 of smaller dimension are parallel with respect to each other. The guiding member 7 in the vertical circular shaft 1 beneath the ring shaped distributing member 2 is cone shaped.

The material to be treated is introduced into the feeding region of the vertical shaft 1 between the inner walls of the hollow distributing member 2 and into the space between the external walls of this hollow distributing member 2 and the opposite wall 3 of the vertical shaft 1. The feeding region is marked by arrows. On the downmovement the stream of material is distributed in such a way that it takes the shape of a converted roof beneath the walls of the hollow distributing member which can be noted from the drawing 2. The granular material passes along the wall of the guiding member 7 and of the inclined chute 6 of the wall 3 of the vertical shaft 1 into the reduced socket between the bottom edge of the guiding member 7 and the bottom edge of the inclined chute 6 of the wall 3 of the vertical shaft 1. Material is distributed on the chute 10 of the additional wall 8 of the vertical shaft 1 and on the wall of the cylinder 12 in the discharge bin 11 via the discharge end of the aforedescribed socket. The gases enter into the material by way of the cylinder 12 through the space between the collar 13 and the top of the cylinder 12 in the discharge bin 11 and, on the other hand, through the gas conduit 9 in the additional wall 8 of smaller diameter of the vertical shaft 1. The gases pass through the material in a countercurrent flow and after being cooled down enter the space of the hollow distributing member 2 and then pass through the outlets 4 out of the vertical shaft 1.

The shaft exchanger constructed according to the present invention is capable of providing a countercurrent heat exchange, which enables to reduce heat consumption per unit of treated material. Owing to the countercurrent heat exchange, the efficiency of the exchanger is increased and the temperature of the discharging gases reduced. The shaft exchanger according to the invention is adapted especially for higher outputs, its dimensions being smaller than those of the current types, and it has a reduced weight and operation cost.

Although our invention has been illustrated and described with reference to the preferred embodiment thereof, we wish to have it understood that it is in no way limited to the details of such embodiment but is capable of numerous modifications within the scope of the appended claims.

What we claim is:

1. A shaft shaped heat exchanger for heat treatment of granular material, comprising a vertical shaft with a feeding region at the top and a discharge region at the bottom;
    a hollow annular distributing member having a cross-section of substantially an inverted U-shape mounted in said heat exchanger for distributing material in the feeding region of the vertical shaft and spaced apart from its wall;
    said hollow distributing member being open at the bottom and having a number of gas outlets at the top;
    a guiding member coaxial with said vertical shaft and mounted below said hollow distributing member and spaced apart therefrom;
    the wall of said vertical shaft narrowing below said hollow distributing member into a first chute;
    an additional vertical wall of said shaft of different diameter than that within the feeding region attached to said narrowing part of the shaft;
    a cylinder for supplying gas co-axially mounted in said shaft and extending from the bottom into the discharge region of said shaft and terminating within the space below said guiding member.

2. A shaft shaped heat exchanger as set forth in claim 1, wherein said hollow distributing member is provided at the bottom with an adjustable extension.

3. A shaft shaped heat exchanger as set forth in claim 1, wherein said narrowing part of said shaft wall extends beyond said additional vertical wall of said shaft, with additional gas inlets terminating at the thus formed space.

4. A shaft shaped heat exchanger as set forth in claim 1, wherein said additional wall of said shaft narrows at its bottom to a second chute which passes over into the wall of the discharge region of said shaft.

5. A shaft shaped heat exchanger as set forth in claim 4, wherein the inclinations of said first and second chutes are equal.

6. A shaft shaped heat exchanger as set forth in claim 1, wherein said guiding member, which is co-axially mounted in said shaft, is provided at the bottom with a collar which narrows toward the axis of said shaft.

7. A shaft shaped heat exchanger as set forth in claim 6, wherein the height of said collar is at least as large as the distance between the bottom edge of said collar and the top of said gas supplying cylinder which extends from the bottom towards said guiding member.

8. A shaft shaped heat exchanger as set forth in claim 1, wherein said guiding member which is co-axially mounted in said shaft has a conical shape with the apex directed upwards.

References Cited

UNITED STATES PATENTS

| | | |
|---|---|---|
| 669,411 | 3/1901 | Guiterman. |
| 735,878 | 8/1903 | Hutton. |
| 3,274,701 | 9/1966 | Niemitz _____ 34—168 XR |

FOREIGN PATENTS 552,289  11/1956  Belgium.

FREDERICK L. MATTESON, JR., *Primary Examiner.*

H. B. RAMEY, *Assistant Examiner.*